United States Patent [19]
Westphal

[11] 3,835,910
[45] Sept. 17, 1974

[54] LIQUID EVAPORATOR AND OPERATION PROCESS THEREFOR

[75] Inventor: Helmut Westphal, Offenbach am Main, Germany

[73] Assignee: Georg Westphal Ing. KG, Offenbach am Main, Germany

[22] Filed: Dec. 14, 1972

[21] Appl. No.: 314,924

[30] Foreign Application Priority Data
Dec. 17, 1971 Germany.............................. 2162838

[52] U.S. Cl................. 159/23, 23/267 C, 159/1 R, 159/43 R, 159/DIG. 13, 202/241
[51] Int. Cl............C10b 43/00, B01b, B01d 1/100, B01d 11/00
[58] Field of Search .. 159/22, 23, 43, 1 C, DIG. 13, 159/33, 27 R, 1 R; 203/11, 4, DIG. 17; 202/241, 235, 205; 122/380, 387; 201/2; 23/276

[56] References Cited
UNITED STATES PATENTS
| | | | |
|---|---|---|---|
| 2,368,665 | 2/1945 | Kohman et al. ................... | 203/10 X |
| 3,342,703 | 9/1967 | Leach .................................... | 203/4 |
| 3,397,116 | 8/1968 | Bourland ........................... | 202/177 |
| 3,397,119 | 8/1968 | Bourland ......................... | 202/177 X |
| 3,408,294 | 10/1968 | Othmer................................ | 210/56 |
| 3,505,171 | 4/1970 | Grow ................................ | 203/11 X |
| 3,527,675 | 9/1970 | Bourland ............................ | 203/11 |

*Primary Examiner*—Jack Sofer
*Attorney, Agent, or Firm*—William Anthony Drucker

[57] ABSTRACT

Known liquid evaporator vessels are provided with removing means for removing depositions from the inner sides of the walls of the vessel. The removing means do not directly contact the walls so that they can only delay the formation of depositions on the walls.

It is the object of this invention to provide improved removing means for removing solid depositions from the inner sides of the walls of the evaporator vessel.

2 Claims, 1 Drawing Figure

PATENTED SEP 17 1974　　3,835,910
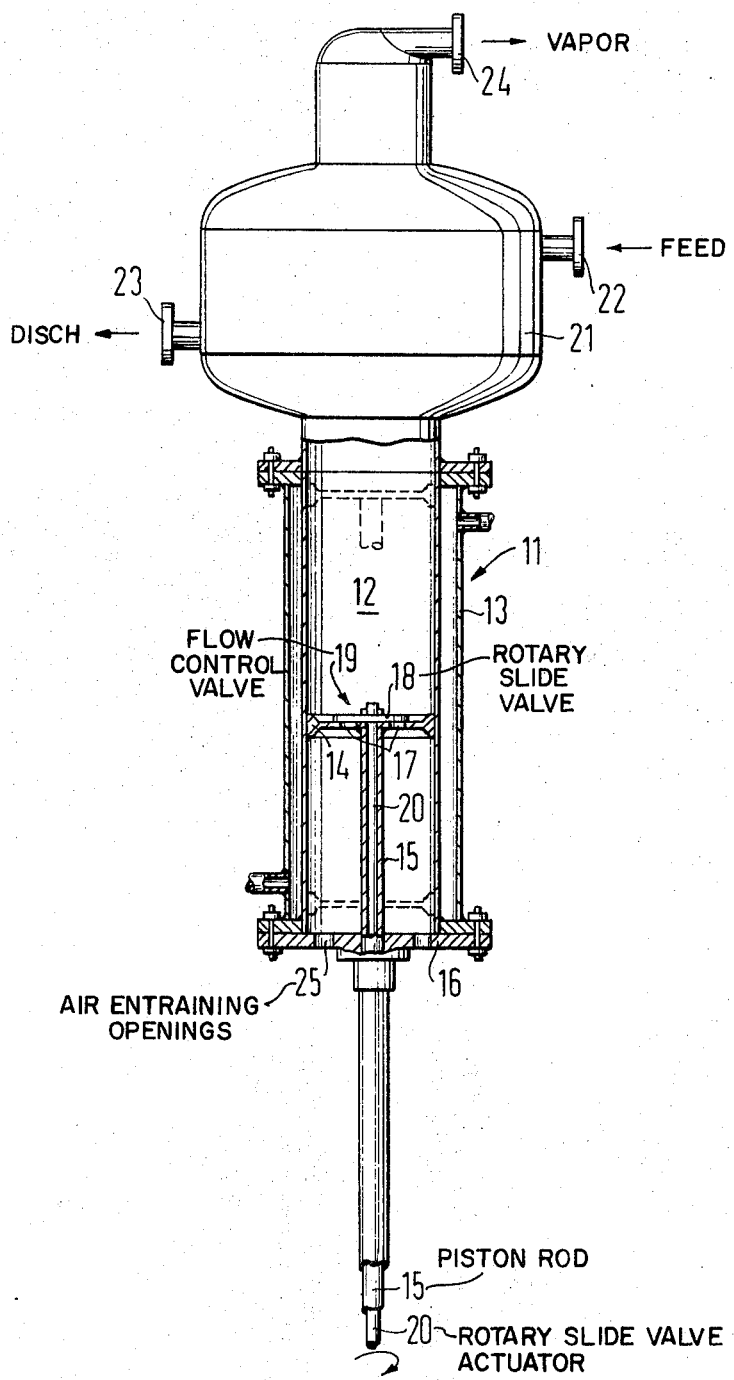

LIQUID EVAPORATOR AND OPERATION PROCESS THEREFOR

During concentrating, that is during the concentration by evaporation, evaporation or heating of substances sensitive to heat like organic liquids, chemical and pharmaceutical solutions and also during the distillation of sea water a coating is formed on the heating surfaces.

This coating results from solid substances precipitated by crystallization, polymerization, fission processes etc.

Moreover, the concentration of some organic liquids is only possible up to a low average concentration due to the changes occurring in the liquid when the concentration exceeds a predetermined limit. For example, the coagulation of the albumen in organic substances is most important.

This adhering coating is very disadvantageous. It also has a detrimental effect on the substances to be dried and prevents a heat-economically favourable operation. The slags deposited on the heating surfaces reduce the heat passage whereas simultaneously the local overheating is increased and damages the product. This reduction in capacity additionally leads to a growing of the thickness of these depositions and finally to the termination of the evaporation process.

The coating is particularly disadvantageous if it is necessary during the evaporation to do with heating surfaces which are as small as possible and low temperature differences between the heating vapor and the liquid to be evaporated as is required in case of the use of exhaust steam as heating means or the use of the thermo-compression cycle.

This invention relates to a liquid evaporator comprising at least one vessel receiving the liquid to be evaporated, said vessel being at least partially defined by heating surfaces, and a removing device arranged in said vessel for removing solid depositions from the walls of the vessel.

In known liquid evaporators of the afore-mentioned type the removing devices associated therewith comprise agitating means rotating in the liquid to be evaporated. These evaporators have proved to be not satisfactory in operation as they are not effective on the walls directly but only indirectly on the formation of depositions e.g. by producing turbulences scavenging the walls of the vessel; therefore, they can at best delay the formation of depositions. The removal of solid substances nevertheless deposited, in particular of highly viscous or solid substances, is not achieved.

It is an object of this invention to improve a liquid evaporator of the afore-mentioned kind so that solid depositions on the vessel walls can be removed.

According to this invention it is proposed to use a cylindrical vessel, that the removing device comprises a removing piston contacting the cylinder wall and said piston is movable along the axis of the cylinder either continuously or intermittently.

With this invention it is achieved that the solid depositions formed on the walls of the vessel can be removed completely so that the capacity of the liquid evaporator can be kept constant.

For a continuous movement in case of a filled liquid vessel the removal piston may be provided with a passage. Advantageously shutoff means may be arranged in said passage. According to an embodiment of this invention a flow controlling valve that can be closed is provided. As the removing piston is effective across the entire area of the vessel walls, said vessel may be surrounded by a heating jacket.

This invention furthermore relates to an operation process for a liquid evaporator according to which the liquid is introduced from a series vessel which is connected in series with said evaporator vessel and positioned higher by lowering said removing piston into said vessel, or removed from said vessel by lifting the removing piston. The provided removing device can thus be used as charging and discharging means, therebeing no necessity of changing the design; a removing process is necessarily carried out when the vessel is filled or emptied.

The accompanying drawing schematically shows an embodiment of the liquid vessel according to this invention in sectional view which will be described in more detail below:

In the vessel 12 a removing piston 14 contacting the inner wall of the vessel is arranged which is movable along the axis of the cylinder by a drive (not shown) via a hollow piston rod 15. This piston rod is sealingly guided through the bottom 16 of the vessel 12. In its center area the removing piston has passages 17 which can be covered by a rotary slide valve 18 and form a flow controlling or shut-off valve 19 with said slide valve. The rotary slide valve 18 is actuated in a known manner by a control rod 20 guided through the hollow piston rod 15 from outside the vessel 12.

The upper end of the vessel 12 ends in a series vessel 21 having an inlet nozzle 22, an outlet nozzle 23 and a vapor outlet 24. The liquid to be treated is fed to the vessel 12 via said series vessel and also withdrawn from the vessel 12.

When the vessel 12 is filled, the removing piston 14 is in an upper position indicated in dotted lines, said shutoff valve 19 being closed.

According to the operation process of this invention, the vessel 12 is filled with the liquid stored in the series vessel 21 by lowering the removing piston 14 to its lowermost position also indicated in dotted lines. When the evaporation process is finished, during which the vapors are withdrawn through the series vessel 21, the removing piston 14 is moved upwardly and pushes back the filling material into the storage vessel 21. The removing piston sliding along the cylinder wall of the vessel 12 thereby strips off the solid depositions on said wall which are then withdrawn from the vessel 12 together with the filling material.

If solid substances are deposited during the evaporation process in an amount that requires cleaning of the cylinder wall, the flow valve 19 is opened by rotating the control rod 20 which can be controlled by a corresponding abutment. In this position of the flow controlling valve the removing piston 14 can be moved along the cylinder wall in abutting relationship therewith as often as desired, there being no necessity of emptying the vessel 12. Air entraining and air conditioning openings 25 provided in the bottom 16 are closed in a suitable manner. For the emptying process by means of the upward movement of the removing piston 14 the flow controlling valve 19 is again closed.

What is claimed is:

1. In a liquid evaporator comprising at least one evaporator vessel the interior surfaces of which are at least partially defined as heating surfaces, and a cleaning device for removing solid deposits from the inner surfaces of said vessel, the improvement consisting in that the heating surfaces comprise a circular cylinder and the cleaning device comprises a coaxial piston rod in the cylinder and a cleaning piston secured to the rod, which is movable along the axis of the cylinder either continuously or intermittently and said piston has at least one passage there through to allow reciprocation of the piston thru the material being treated within the cylinder and hence permitting cleaning by the piston of the cylindrical wall during evaporation.

2. In a liquid evaporator as set forth in claim 1 the improvement further consisting in a shut-off valve means in said piston passage.

* * * * *